(12) United States Patent
Masuda et al.

(10) Patent No.: US 8,108,084 B2
(45) Date of Patent: Jan. 31, 2012

(54) VEHICLE DISPLAY DEVICE

(75) Inventors: Toshio Masuda, Tokyo (JP); Kenichi Yamamoto, Tokyo (JP); Kenji Hijikata, Tokyo (JP); Satoshi Satomura, Tokyo (JP); Hiroshi Oishi, Tokyo (JP); Toyohide Sunaguchi, Tokyo (JP); Yoshio Iwakami, Tokyo (JP); Munenori Homma, Tokyo (JP); Atsushi Atake, Tokyo (JP); Kouji Kaneda, Tokyo (JP); Tatsuru Fukuda, Tokyo (JP); Minoru Yuki, Tokyo (JP); Masayuki Ushiki, Tokyo (JP); Tsuyoshi Kobayashi, Tokyo (JP); Masahito Motoi, Tokyo (JP); Naoki Shibata, Tokyo (JP); Hiroshi Ogiwara, Tokyo (JP); Katsumasa Igarashi, Tokyo (JP); Junzo Shinozuka, Tokyo (JP); Akihisa Nakamura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1314 days.

(21) Appl. No.: 11/783,275

(22) Filed: Apr. 6, 2007

(65) Prior Publication Data
US 2007/0247975 A1 Oct. 25, 2007

(30) Foreign Application Priority Data

Apr. 7, 2006 (JP) ................................. 2006-106146
May 19, 2006 (JP) ................................. 2006-140753

(51) Int. Cl.
*G06F 19/00* (2011.01)
(52) U.S. Cl. ........................................... 701/1; 180/167
(58) Field of Classification Search ................ 701/1, 70, 701/80, 84, 85, 90, 96, 91; 180/167, 171, 180/168, 170
See application file for complete search history.

(56) References Cited

U.S. PATENT DOCUMENTS

| 6,428,444 | B1 * | 8/2002 | Tabata | 477/3 |
| 6,694,806 | B2 * | 2/2004 | Kumagai et al. | 73/114.52 |
| 6,719,076 | B1 * | 4/2004 | Tabata et al. | 180/65.7 |

FOREIGN PATENT DOCUMENTS

| JP | 02-099439 | 4/1990 |
| JP | 10-131780 | 5/1998 |
| JP | 11-220807 | 8/1999 |
| JP | 2000-087772 A | 3/2000 |
| JP | 2001-107766 | 4/2001 |

(Continued)

OTHER PUBLICATIONS

Japanese Office Action dated Nov. 24, 2010.

(Continued)

*Primary Examiner* — Dalena Tran
(74) *Attorney, Agent, or Firm* — McGinn IP Law Group, PLLC

(57) ABSTRACT

The present invention provides a vehicle display device which allows a driver to instantaneously grasp driving force information. A meter_ECU displays a driving force display image which displays driving force information of a vehicle on an MID, displays an acceleration-torque line (driving force characteristic line) L corresponding to the currently selected mode M and, at the same time, changes a power level which is indicated in a power display region P set within the acceleration-torque line L interlockingly with an accelerator operation of a driver. Due to such a constitution, the vehicle display device allows the driver to instantaneously grasp the driving force information.

20 Claims, 15 Drawing Sheets

FOREIGN PATENT DOCUMENTS

| | | |
|---|---|---|
| JP | 2002-089349 | 3/2002 |
| JP | 2002-114056 | 4/2002 |
| JP | 2003-211996 A | 7/2003 |
| JP | 2004-196055 A | 7/2004 |
| JP | 2005-188384 | 7/2005 |
| JP | 2005-249098 | 9/2005 |
| JP | 2005-283176 | 10/2005 |
| JP | 2005-315171 A | 11/2005 |
| JP | 2005-335702 A | 12/2005 |
| JP | 2006-063959 A | 3/2006 |
| JP | 2006-074931 A | 3/2006 |

OTHER PUBLICATIONS

Japanese Office Action dated Mar. 15, 2011, with partial English translation.
Japanese Office Action dated Aug. 15, 2006.
Japanese Office Action dated Dec. 26, 2006.
Japanese Office Action dated May 1, 2007.
Japanese Office Action dated Aug. 30, 2011 with partial English translation.
Japanese Office Action dated Oct. 18, 2011 with partial English translation.

* cited by examiner

VEHICLE DISPLAY DEVICE

CROSS-REFERENCE TO RELATED APPLICATIONS

The disclosures of Japanese Application No. 2006-106146 filed on Apr. 7, 2006 and No. 2006-140753 filed on May 19, 2006 including the specification, drawings and abstract is incorporated herein by reference in its entirety.

BACKGROUND OF THE INVENTION

1. Field of the Invention

The present invention relates to a vehicle display device which displays traveling information of a vehicle to a driver.

2. Description of the Related Art

Conventionally, in an engine with a so-called electronically controlled throttle in which a throttle valve is electronically controlled using a throttle actuator, an accelerator pedal and the throttle valve are not mechanically linked and hence, opening of the throttle valve (throttle opening) can be controlled with nonlinear characteristic with respect to an operation amount of the accelerator pedal (accelerator opening degree).

For example, publication of unexamined patent application JP A 2005-188384 discloses a technology in which an operation state of an engine is divided into a plurality of operation regions based on an engine rotational speed and accelerator opening degree and a map is set for each operation region to perform control of the throttle valve conforming to the operation state of the engine.

According to the technology disclosed in this document, a favorable operation performance is achieved by allowing the engine to exhibit the maximum potential during high-speed traveling, while a favorable driveability is achieved by operating the engine with the suppressed power when stopping and starting are repeated as in the case of a traffic jam.

SUMMARY OF THE INVENTION

However, as in the case of the technique disclosed in this document, particularly, with respect to a vehicle in which plural kinds of driving force characteristics of the engine are set, there may be a case that the driver cannot grasp the present operation state (driving force information) of the vehicle. In such a case, the driver is compelled to perform a careful acceleration operation thus deteriorating comfortable drive ability.

The invention has been made under such circumstances and it is an object of the invention to provide a vehicle display device which allows a driver to instantaneously grasp driving force information.

A first aspect of this invention of a vehicle display device comprises a display means, a display control means for displaying a driving force display image which displays driving force information of a vehicle on the display means, the display control means displays driving force characteristic lines on the driving force display image and changes the display of the driving force characteristic lines with respect to an accelerator operation of a driver.

According to a second aspect of this invention according to the first aspect, the vehicle display device is mounted on the vehicle which includes a driving force determination means which determines a driving force corresponding to accelerator opening degree selectively using a plurality of modes in which different driving force characteristics are set, and the display control means displays the driving force characteristic line corresponding to a selected mode on the driving force display image, and changes a display of the driving force characteristic lines with respect to an accelerator operation of the driver.

According to a third aspect of this invention according to the second aspect, the display control means, when the selected mode is changed over, displays a changeover display image for displaying the changeover information of the mode to the display means as an interruption image for a set time.

According to a fourth aspect of this invention according to the third aspect, the display control means simultaneously displays the respective driving force characteristic lines corresponding to the respective modes on the changeover display image and, displays the driving force characteristic line corresponding to the newly changed-over mode in an emphasizing manner.

Furthermore, according to a fifth aspect of this invention according to the first aspect, the vehicle display device includes a display changeover means which performs a changeover manipulation of a display image displayed on the display means, and the display control means displays plural kinds of display images including the driving force display image by selectively changing over in response to a manipulation input to the display changeover means.

According to the invention, the vehicle display device allows the driver to instantaneously grasp the driving force information.

PREFERRED EMBODIMENTS OF THE INVENTION

Figure 1:
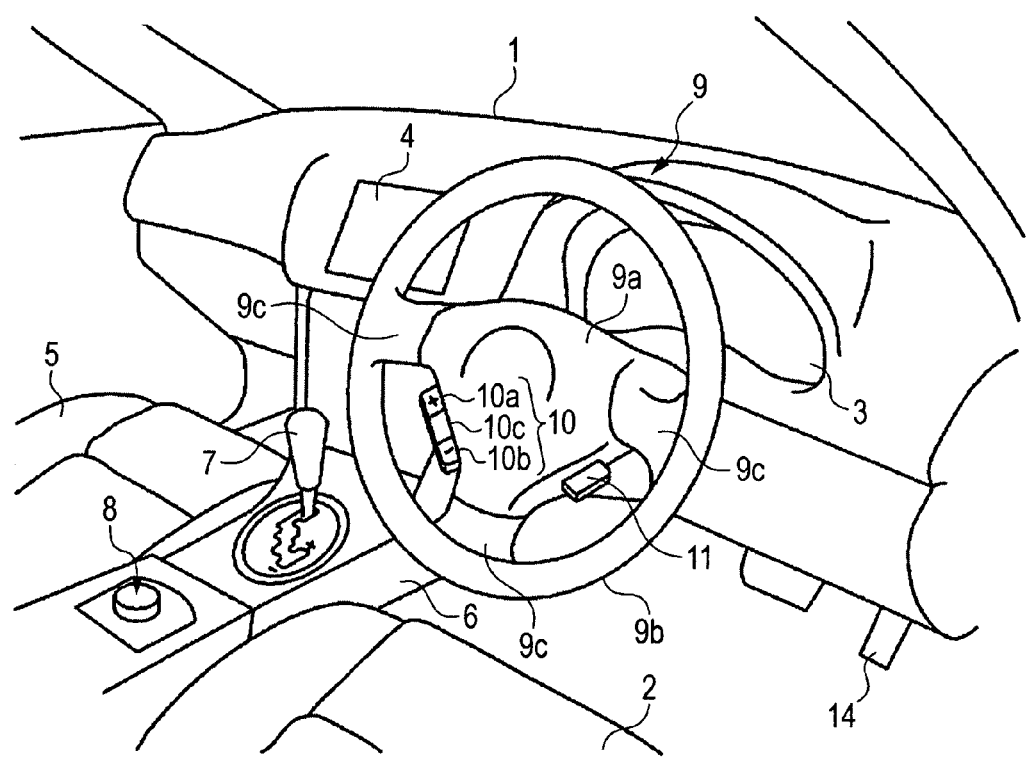
FIG. 1 is a perspective view of an instrument panel and a center console as viewed from a driver's seat side.

Hereinafter, one embodiment of the invention is explained in conjunction with drawings. FIG. 1 shows a perspective view of an instrument panel and a center console as viewed from a driver's seat side.

As shown in FIG. 1, the instrument panel 1 which is arranged in a front portion in the inside of a cabin of a vehicle extends laterally in the vehicle width direction, and a combination meter 3 is arranged on the instrument panel 1 which is positioned in front of a driver's seat 2. Further, at the substantially center of the instrument panel 1 in the vehicle width direction, a center display 4 which is used as a display means constituting a well-known car navigation system is arranged.

Further, on a center console 6 which is arranged between the driver's seat 2 and a passenger seat 5 and extends toward a rear side of a vehicle body from the instrument panel 1 side, a selection lever 7 which is used to select a range of an automatic transmission is arranged, and a mode selection switch 8 which is used as a selection means for selecting driving force characteristic of an engine is arranged behind the selection lever 7. Further, a steering wheel 9 is arranged in front of the driver's seat 2.

The steering wheel 9 includes a center pad portion 9a which houses an air bag or the like, and the center pad portion 9a and left, right and lower portions of a grip portion 9b which is arranged around the center pad portion 9a are connected with each other by way of 3 spokes 9c. A display changeover switch 10 which is used as a display changeover means is arranged on a left lower portion of the center pad portion 9a. Further, a temporarily changeover switch 11 which is used as a temporarily changeover means is arranged on a right lower portion of the center pad portion 9a.

Figure 2:
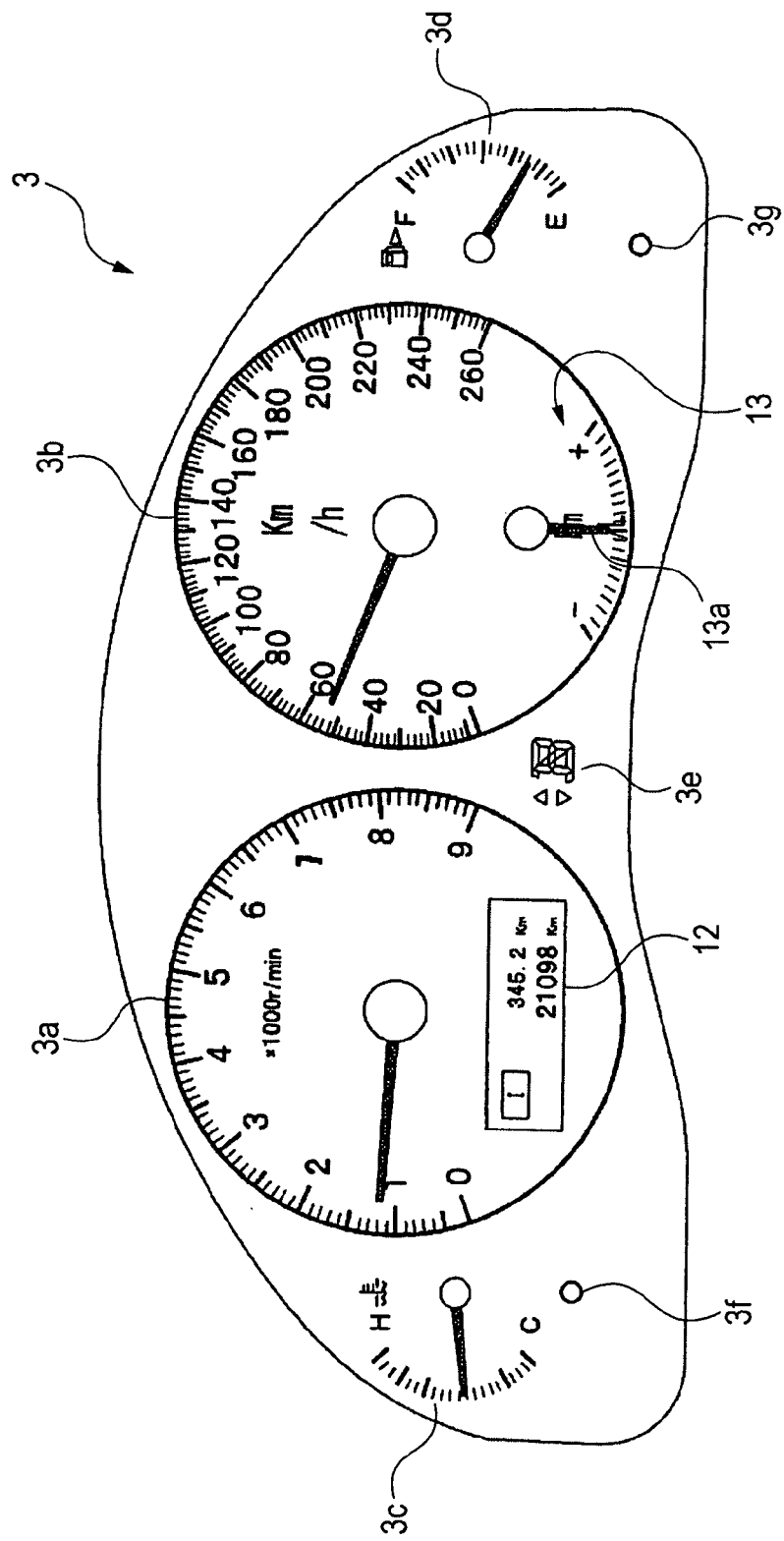
FIG. 2 is a front view of a combination meter.

Further, as shown in FIG. 2, on left and right sides of the combination meter 3 close to the center, a tachometer 3a which indicates an engine rotational speed and a speed meter 3b which indicates a vehicle speed are respectively arranged. Further, a water temperature meter 3c which indicates a cooling water temperature is arranged on the left side of the tachometer 3a, and a fuel level meter 3d which indicates residual fuel quantity is arranged on the right side of the speed meter 3b. Further, a gearshift position display portion 3e which indicates a current position of gearshift is arranged on a center portion of the combination meter 3. Here, symbol 3f indicates a warning lamp, and symbol 3g indicates a trip reset switch which resets a trip meter. A push button of the trip reset switch 3g projects toward the driver's seat 2 side from the combination meter 3, and the trip meter is reset when the driver or the like continuously turns on the trip reset switch 3g for a predetermined time or more by pushing the push button.

Further, on a lower portion of the tachometer 3a, a multi information display (hereinafter, abbreviated as "MID") 12 which is used as a display means for respectively displaying information such as mileage, fuel consumption, the engine driving force by changing over a plurality of display images is arranged. Further, on a lower portion of the speed meter 3b, a fuel consumption meter 13 which indicates a state of fuel efficiency based on the difference between the instantaneous fuel consumption and the trip average fuel consumption is arranged.

Figure 3:
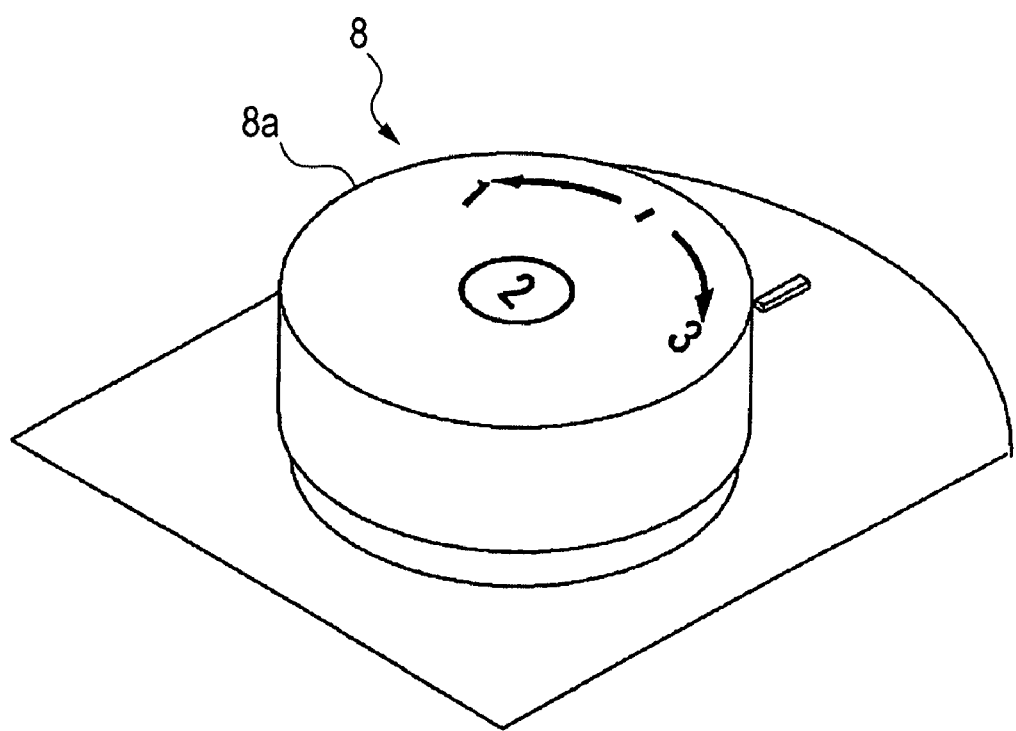
FIG. 3 is a perspective view of a mode selection switch.

Further, as shown in FIG. 3, the mode selection switch 8 is a shuttle switch which arranges a push switch parallel thereto. When an operator (since the operator is generally the driver, the explanation is made by referring the operator as "driver" hereinafter) manipulates a manipulation knob 8a, the driver can select three kinds of modes described later (a normal mode 1 which is a first mode, a save mode 2 which is a second mode, and a power mode 3 which is a third mode). That is, in this embodiment, by rotating the manipulation knob 8a in the left direction, a left switch is turned on and the normal mode 1 is selected. By rotating the manipulation knob 8a in the right direction, a right switch is turned on and the power mode 3 is selected. On the other hand, by pushing the manipulation knob 8a in the lower direction, the push switch is turned on and the save mode 2 is selected. Here, by allocating the save mode 2 to the push switch, even when the push switch is turned on erroneously during traveling, for example, the mode is just changed over to the save mode 2 where an output torque is suppressed as described later, hence there is no possibility that the driving force is acutely increased thus ensuring the safe driving of the driver.

Here, output characteristics of the respective modes 1 to 3 are briefly explained. The normal mode 1 is set such that an output torque is changed approximately linearly with respect to a operation amount of the accelerator pedal 14 (accelerator opening degree) (see FIG. 11A). The normal mode 1 is a mode which is suitable for normal driving.

Further, the save mode 2 is set as a mode in which by saving an engine torque alone or by saving an engine torque in synchronism with a lock-up control in case of an automatic transmission, smooth output characteristic is obtained while ensuring a sufficient output thus allowing a driver to enjoy the acceleration work. Further, in the save mode 2, the output torque is suppressed and hence, it is possible to achieve both of the easy drive ability and low fuel consumption (economical efficiency) in a well balanced manner. Further, for example, even in case of a vehicle with a 3 litter engine, the smooth output characteristic is obtained while ensuring a sufficient output corresponding to the 2 litter engine. Particularly, the easy-to-drive performance is achieved in a practical-use region such as traveling in towns.

The power mode 3 is set as a mode in which the output characteristics with an excellent response from a low speed region to a high speed region of the engine is achieved and, at the same time, in case of an automatic transmission, a shift-up point is changed in accordance with engine torque, hence the vehicle can cope with a sporty or zippy driving on a winding load or the like. That is, in the power mode 3, the high response characteristic is set with respect to the operation amount of the accelerator pedal 14 and hence, in case of a vehicle with a 3 litter engine, for example, a maximum torque is generated at a lower operation amount of the accelerator pedal 14 such that a potential of the 3 litter engine can be exercised at maximum. Here, driving force indication values (target torques) of the respective modes (normal mode 1, save mode 2, power mode 3) are, as described later, set based on 2 parameters consisting of an engine rotational speed and accelerator opening degree.

Figure 4:
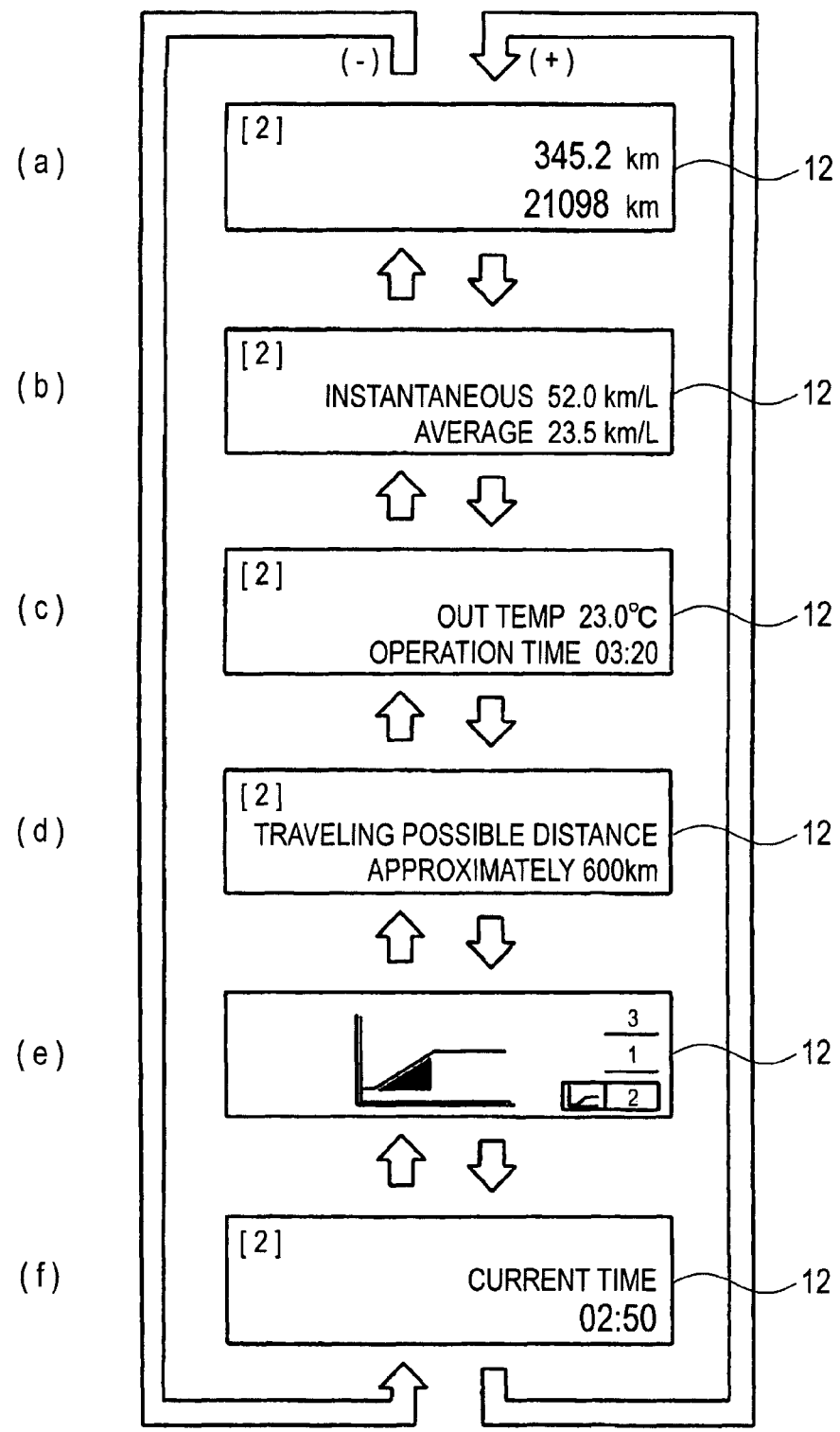
FIG. 4 is an explanatory view showing a display example of a multi-information display.

A display changeover switch 10 is manipulated to change over information displayed on a MID 12 and includes a forward feeding switch portion 10a, a reverse feeding switch portion 10b, and a reset switch portion 10c. FIG. 4 illustrates items for every images displayed on the MID 12 as an example. Here, the MID 12 may be a color display.

In this embodiment, 6 kinds of images (a) to (f) are set, wherein each time the forward feeding switch portion 10a is turned on, the images are changed over in order from (a) to (f). When the forward feeding switch portion 10a is turned on in a state that the image (f) is displayed, the initial image (a) is displayed. On the other hand, when the reverse feeding switch portion 10b is turned on, the image is changed over in the reverse direction.

The image (a) is an initial image which is displayed when the ignition switch is turned on. On the image (a), an odometer is displayed in a lower stage and a trip meter is displayed in an upper stage. Further, a current mode ("2" indicative of the save mode 2 in the drawing) is displayed at a left end of the image (a).

On the image (b), a mileage measured by the trip meter and a trip average fuel consumption [km/L] calculated based on a total fuel injection pulse width (pulse time) in the mileage are displayed in a lower stage, while a mileage during several seconds and an instantaneous fuel consumption [km/L] calculated based on the total fuel injection pulse width (pulse time) in the moment are displayed in an upper stage.

On the image (c), an operation time from a point of time that the engine is started is displayed in a lower stage and an outside temperature [° C.] is displayed in an upper stage.

On the image (d), an approximately traveling possible distance [Km] calculated based on residual fuel quantity in the inside of a fuel tank and the trip average fuel consumption is displayed.

On the image (e), an acceleration-torque line of the currently selected mode (the save mode 2 being indicated in the drawing) is displayed. In the acceleration-torque line, an output torque of the engine is taken on an axis of ordinates and the accelerator opening degree is taken on an axis of abscissas, and a power display region P is set in the inside of the displayed acceleration-torque line. In the power display region P, being interlocked with the increase or the decrease of the accelerator opening degree, the band showing the power level is linearly expanded or contracted in a transverse direction. Accordingly, by observing the displayed power level, the driver can easily grasp the current driving state.

The current time is displayed on the image (f).

Figure 5A:
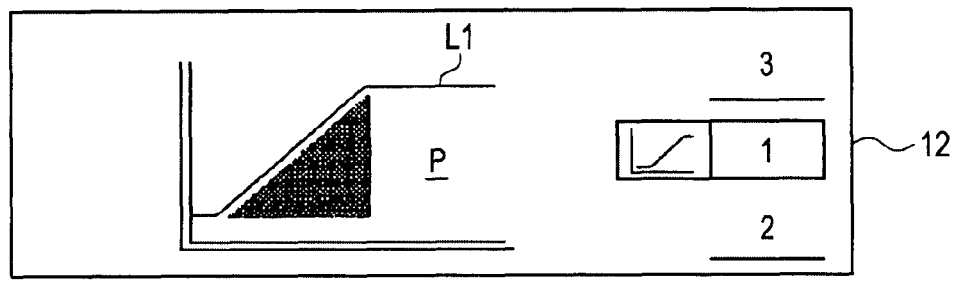
FIG. 5A to FIG. 5C are explanatory views showing a display example of the multi-information display at the time of changing over a mode.
Figure 5B:
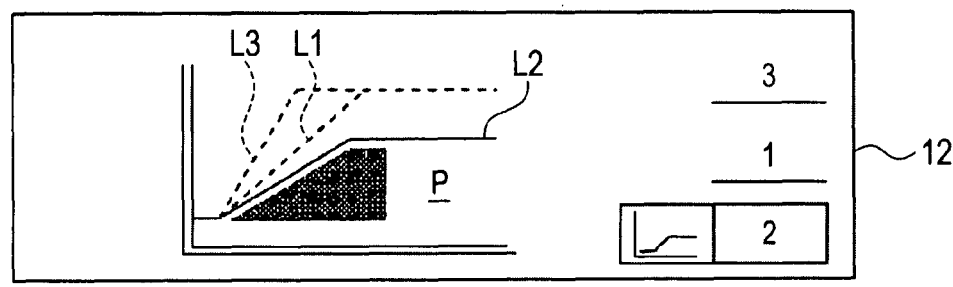
Figure 5C:
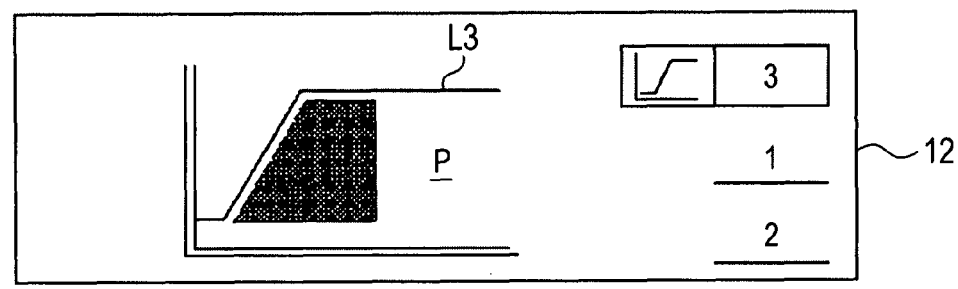

As shown in FIG. 5A to FIG. 5C, the above-mentioned acceleration-torque line displayed on the image (e) differs for every selected mode, that is, the normal mode 1, the save mode 2 or the power mode 3. FIG. 5A shows the acceleration-torque line L1 which constitutes a driving force characteristic line displayed when the normal mode 1 is selected. FIG. 5B shows the acceleration-torque line L2 which constitutes a driving force characteristic line displayed when the save mode 2 is selected. And FIG. 5C shows the acceleration-torque line L3 which constitutes a driving force characteristic line displayed when the power mode 3 is selected.

Here, the above-mentioned image (e) shown in FIG. 4 may be displayed on the MID 12 as an initial image when the ignition switch is turned on. In this case, immediately after the initial image is displayed, the respective acceleration-torque lines L1, L2, L3 are simultaneously displayed and, with a time delay, other acceleration-torque lines may be faded out while leaving only the acceleration-torque line corresponding to the currently set mode.

In FIG. 5B, to compare the driving force characteristics of the acceleration-torque lines L1, L2, L3 for respective modes, the acceleration-torque lines L1, L3 are indicated by a broken line in an overlapped manner. Here, these acceleration-torque lines L1, L3 are indicated for the conveniences sake and are not displayed in an actual operation. As shown in FIG. 5B, the power mode 3 possesses the characteristic which exhibits a larger throttle change quantity in response to a step-on operation of the accelerator pedal. Here, a larger target torque is set with respect to the accelerator opening degree. The normal mode 1 is set to possess the characteristic where the throttle opening is linearly arranged with respect to the operation amount of the accelerator pedal. Compared to the driving force characteristic of the power mode 3, the normal mode 1 possesses the characteristic which exhibits the relatively small throttle change quantity in response to the step-on operation of the accelerator pedal. That is, the normal mode 1 is set to acquire the favorable driving performance in a usual driving region where the accelerator opening degree is relatively small.

Further, the save mode 2 is is set such that the driver can enjoy the acceleration work with the smooth output characteristic while ensuring a sufficient output.

Here, the content displayed in FIG. 5A to FIG. 5C (the image shown in FIG. 4(e)) may be always displayed on an information display which is separately provided in the inside of the tachometer 3a. Alternatively, only the display content shown in FIG. 5A to FIG. 5C is displayed on the MID 12 and other display contents shown in FIG. 4 may be displayed on an information display which is additionally provided.

Further, in the fuel consumption meter 13, a neutral position indicates the trip average fuel consumption [Km/L]. When the instantaneous fuel consumption [Km/L] is higher than the trip average fuel consumption [Km/L], a pointer 13a is swung in the plus (+) direction in response to the deviation, while when the instantaneous fuel consumption [Km/L] is lower than the trip average fuel consumption [Km/L], the pointer 13a is swung in the minus (−) direction in response to the deviation.

Figure 6:
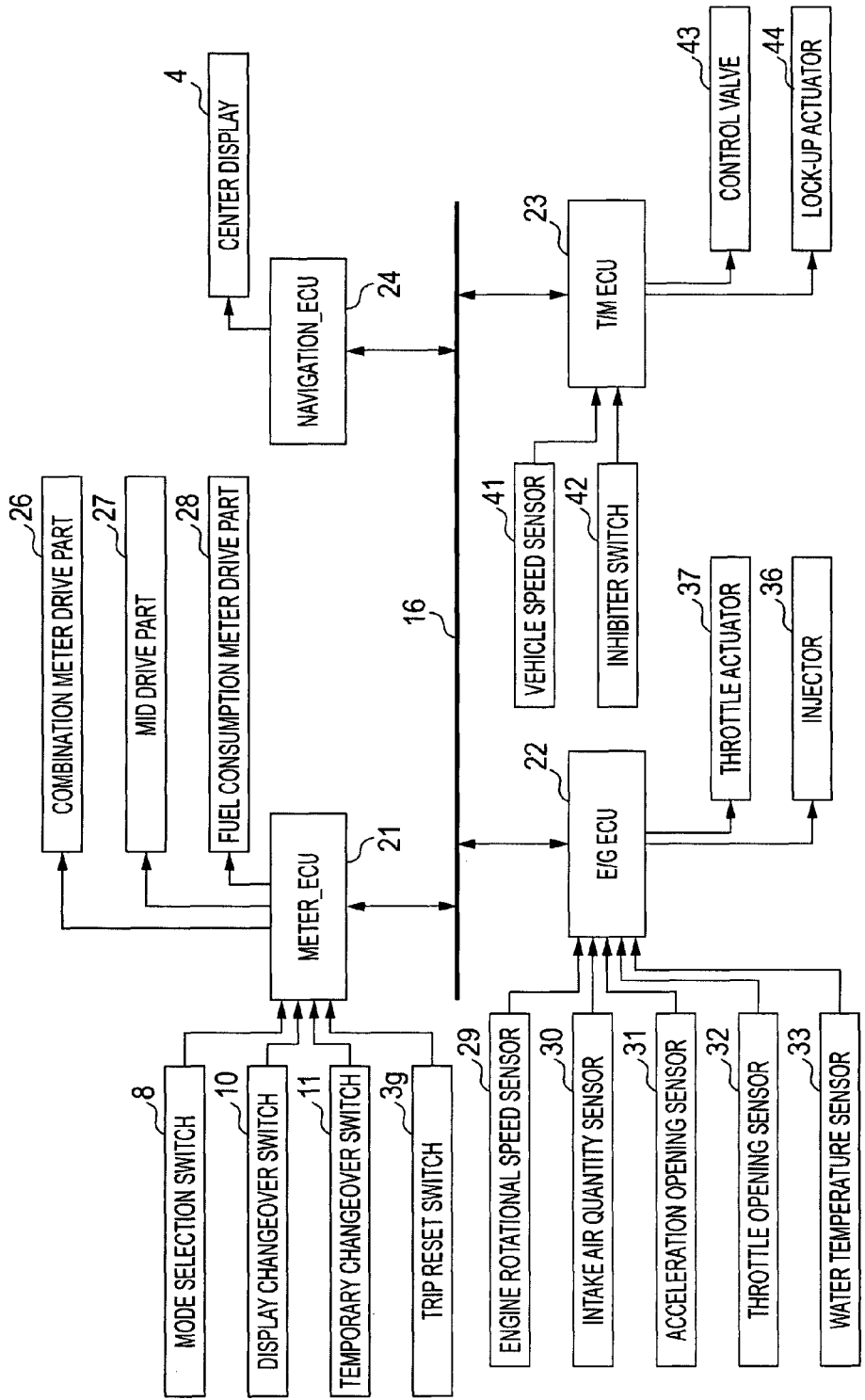
FIG. 6 is a constitutional view of a driving force control device.

Here, as shown in FIG. 6, to the vehicle, through an interior communication circuit 16 such as a CAN (Controller Area Network) communication, control devices which constitutes arithmetic operation means for controlling the vehicle such as a meter control device (meter_ECU) 21, an engine control device (E/G_ECU) 22, a transmission control device (T/M_ECU) 23, a navigation control device (navigation_ECU) 24 are connected in an intercommunicable manner. Each one of the ECU 21 to 24 is mainly constituted of a computer such as a microcomputer and includes well-known CPU, ROM, RAM and a non-volatile memory means such as EEPROM.

The meter_ECU 21 is provided for controlling the whole display of the combination meter 3. Here, the mode selection switch 8, the display changeover switch 10, a temporary changeover switch 11 and the trip reset switch 3g are connected to an input side of the meter_ECU 21, while instruments such as the tachometer 3a, the speed meter 3b, the water temperature meter 3c, the fuel meter 3d, a combination meter drive part 26 which drives the warning lamp 3f, an MID drive part 27, and a fuel meter drive part 28 are connected to an output side of the meter_ECU 21.

The E/G_ECU 22 is provided for controlling an operation state of the engine. To an input side of the E/G_ECU 22, a group of sensors which detect the vehicle and engine operation states such as an engine rotational speed sensor 29 which constitutes an operation state detection means for detecting an engine rotational speed which is a typical example of parameters indicating the engine operation state based on a rotation of a crankshaft or the like, an intake air quantity sensor 30 which is arranged immediately downstream of an air cleaner or the like and detects the intake air quantity, an accelerator opening sensor 31 which constitutes an accelerator opening detection means for detecting accelerator opening degree of the accelerator pedal 14, a throttle opening sensor 32 which is interposed in an intake passage and detects opening of a throttle valve (not shown in the drawing) for adjusting an intake air quantity supplied to respective cylinders of the engine, a water temperature sensor 33 which constitutes an engine temperature detection means for detecting cooling water temperature indicative of an engine temperature are connected. Further, to an output side of the E/G_ECU 22, a group of actuators which controls the driving of the engine such as an injector 36 which injects a predetermined measured fuel to a combustion chamber, a throttle actuator 37 which is mounted in an electronic throttle control device (not shown in the drawing) are connected.

The E/G_ECU 22 sets fuel injection timing and a fuel injection pulse width (pulse time) with respect to the injector 36 based on inputted detection signals from the respective sensors. Further, E/G_ECU 22 outputs the throttle driving signal to the throttle actuator 37 which drives the throttle valve thus controlling the opening of the throttle valve.

Figure 11A:
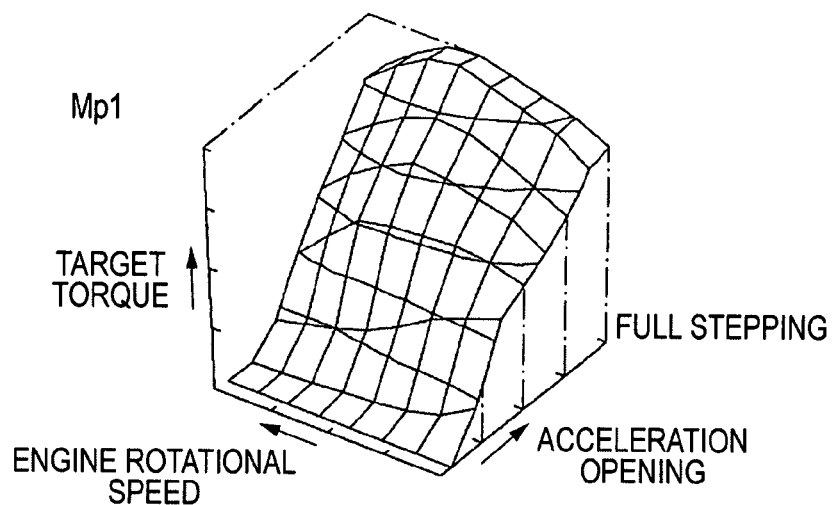
FIG. 11A is a conceptual view of a normal mode map.
Figure 11B:
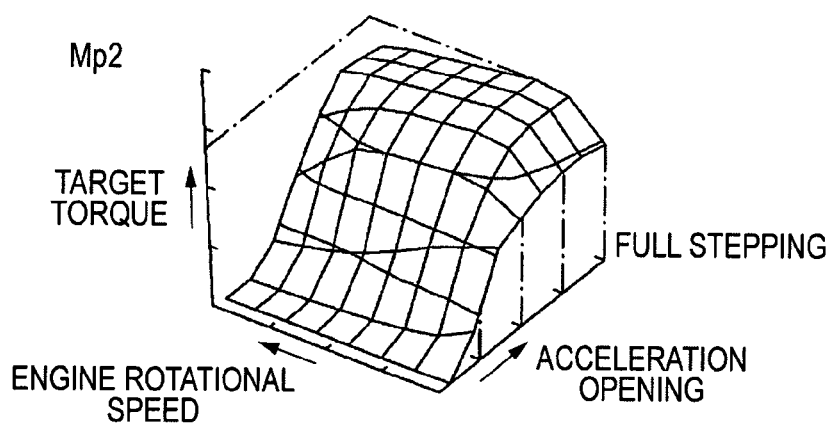
FIG. 11B is a conceptual view of a save mode map.
Figure 11C:
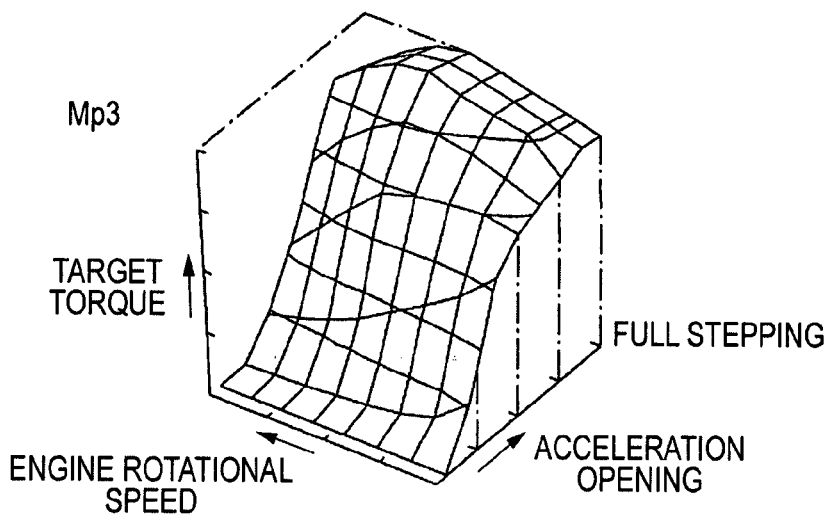
FIG. 11C is a conceptual view of a power mode map.

Here, in the volatile memory means which is provided to the E/G_ECU 22 and constitutes a portion of the driving force setting means, a plurality of different driving force characteristics is stored in a map form. As the respective driving force characteristics, in this embodiment, three kinds of mode maps Mp1, Mp2, Mp3 are provided. As shown in FIG. 11A to FIG. 11C, the respective mode maps Mp1, Mp2, Mp3 are configured as a three-dimensional map in which the accelerator opening degree and the engine rotational speed are taken on matrix axes, and driving force indication values (target torques) are stored in respective matrix points.

The respective mode maps Mp1, Mp2, Mp3 are basically selected by the manipulation of the mode selection switch 8. That is, when the normal mode is selected by the mode selection switch 8, the normal mode map Mp1 which constitutes the first mode map is selected. When the save mode 2 is selected by the mode selection switch 8, the save mode map Mp2 which constitutes the second mode map is selected. Further, when the power mode 3 is selected by the mode selection switch 8, the power mode map Mp3 which constitutes the third mode map is selected.

Hereinafter, the driving force characteristics of the respective mode maps Mp1, Mp2, Mp3 are explained. The normal mode map Mp1 shown in FIG. 11A is set to exhibit the characteristic in which the target torque is linearly changed in a region where the accelerator opening degree is relatively small, and the maximum target torque is obtained when the opening of the throttle valve is close to a wide-open throttle.

Further, in the save mode map Mp2 shown in FIG. 11B, compared to the above-mentioned normal mode map Mp1, the elevation of the target torque is suppressed and hence, the driver can enjoy the acceleration work by widely using the stroke of the accelerator pedal 14. Further, since the elevation of the target torque is suppressed, it is possible to achieve both of the easy drive ability and the low fuel consumption in a well balanced manner. For example, in case of a vehicle with a 3 litter engine, the smooth output characteristic is obtained while ensuring a sufficient output corresponding to the 2 litter engine. Particularly, the target torque is set to achieve easy-to-drive performance in a practical-use region such as traveling in towns.

Further, in the power mode map Mp3 shown in FIG. 11C, a change rate of the target torque in response to the change of the accelerator opening degree is largely set in the substantially all driving region. Accordingly, for example, in case of a vehicle with a 3 litter engine, the target torque is arranged to maximize potential of the 3 litter engine. Here, the substantially same driving force characteristic is set in a low speed region including an idling rotational speed in the respective mode maps Mp1, Mp2, Mp3.

In this manner, according to this embodiment, when any one of the modes 1, 2, 3 is selected in response to the manipulation of the mode selection switch 8 by the driver, the corresponding mode map Mp1, Mp2 or Mp3 is selected, and the target torque is set based on the mode map Mp1, Mp2 or Mp3 and hence, the driver can enjoy three kinds of acceleration responses which differ completely from each other using one vehicle.

Here, an open/close speed of the throttle valve is also set such that the throttle valve is operated gently in the mode map Mp2 and is rapidly operated in the mode map Mp3.

Further, the T/M_ECU 23 is provided for performing the gear change control of the automatic transmission. To an input side of the T/M_ECU 23, a vehicle speed sensor 41 which detects a vehicle speed based on a rotational speed of a transmission output shaft or the like, an inhibiter switch 42 which detects a range in which the selection lever 7 is positioned are connected, while to an output side of the T/M_ECU 23, a control valve 43 which performs the gear change control of the automatic transmission and a lock-up actuator 44 which performs a lock-up operation of a lock-up clutch are connected. The T/M_ECU 23 determines the range of the selection lever 7 in response to a signal from the inhibitor switch 42. When the selection lever 7 is positioned in a D range, the T/M_ECU 23 performs the change gear control by outputting a change gear signal to the control valve 43 in accordance with a predetermined transmission pattern. Here, the transmission pattern is variably set corresponding to the modes 1, 2, 3 set in the E/G_ECU 22.

Further, when the lock-up condition is satisfied, a slip lock-up signal or a lock-up signal is outputted to the loch-up actuator 44 so as to changeover the relationship between input/output elements of a torque converter into a slip lock-up state or a lock-up state from a converter state. Here, the E/G_ECU 22 corrects the target torque τe when the state of the torque converter is changed to a slip lock-up state or a lock-up state. As a result, for example, when the mode M is set to the save mode 2, the target torque τe is corrected to the one which allows more fuel efficient traveling.

The navigation_ECU 24 is mounted in a well-known car navigation system, and detects a position of the vehicle based on positional data obtained from a GPS satellite or the like and, at the same time, calculates a guide route to the destination. Further, the navigation_ECU 24 displays the present position and the guide route of the own car as the map data on the center display 4. In this embodiment, the navigation_ECU 24 can display various information to be displayed on the MID 12 on the center display 4.

Next, steps for controlling the operation state of the engine executed by the above-mentioned E/G_ECU 22 is explained in accordance with flowcharts shown in FIG. 7 to FIG. 10.

Figure 7:
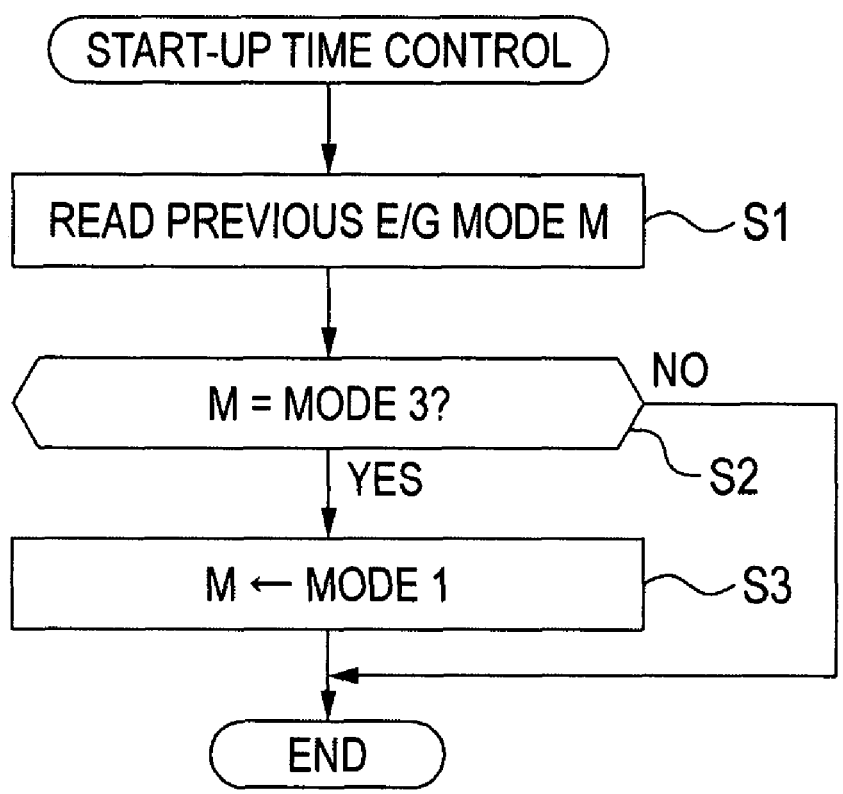
FIG. 7 is a flowchart showing a starting time control routine.

When the ignition switch is turned on, first of all, the start-up time control routine shown in FIG. 7 is initiated only one time. In this routine, first of all, in step S1, the mode M (M: normal mode 1, save mode 2, power mode 3) stored the last time the ignition switch was turned off is read.

Then, the processing advances to step S2, and it is determined whether the mode M is the power mode 3 or not. When the mode M is the power mode 3, the mode M is forcibly set to the normal mode 1 (M←mode 1) and the routine is finished.

Further, when the mode M is the mode other than the power mode 3, that is, the normal mode 1 or the save mode 2, the routine is finished as it is.

In this manner, when the mode M stored the last time the ignition switch was turned off is the power mode 3, the mode M at the time of turning on the ignition switch is forcibly changed to the normal mode 1 (M←mode 1), hence there is no possibility that the vehicle starts rapidly and, thus, the vehicle can obtain the favorable start performance even when the accelerator pedal 14 is slightly depressed.

Figure 8:
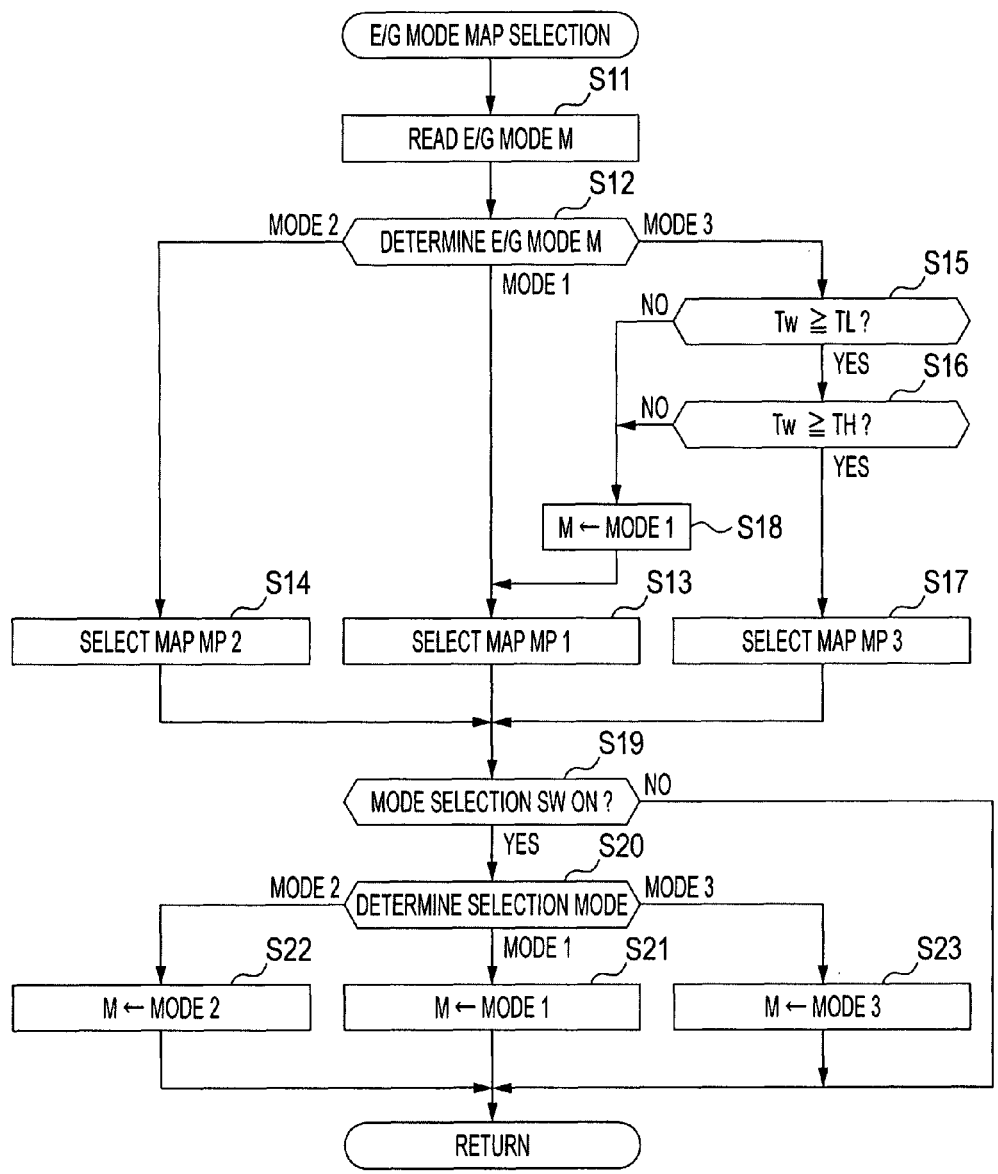
FIG. 8 is a flowchart showing a mode map selection routine.
Figure 9:
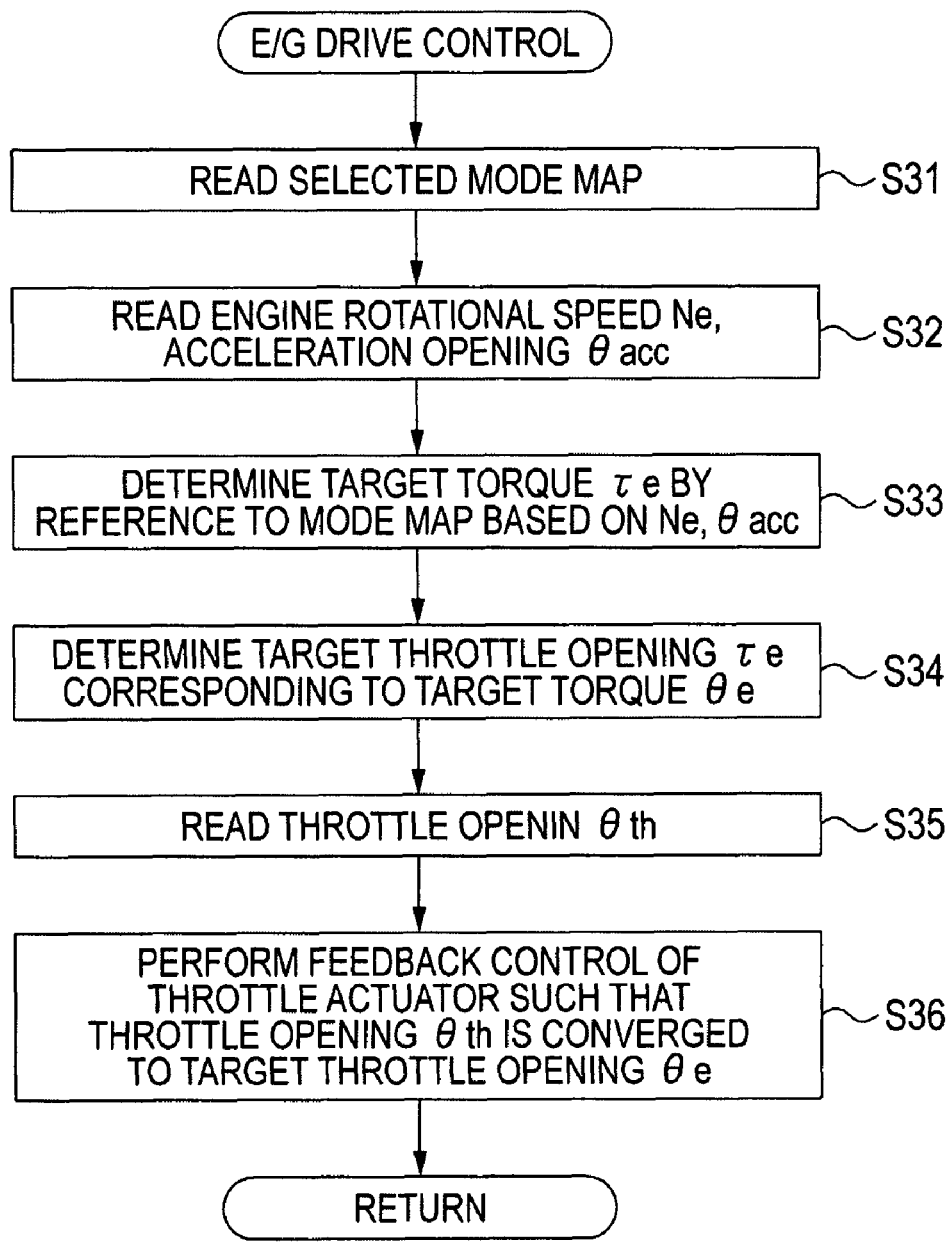
FIG. 9 is a flowchart showing an engine control routine.
Figure 10:
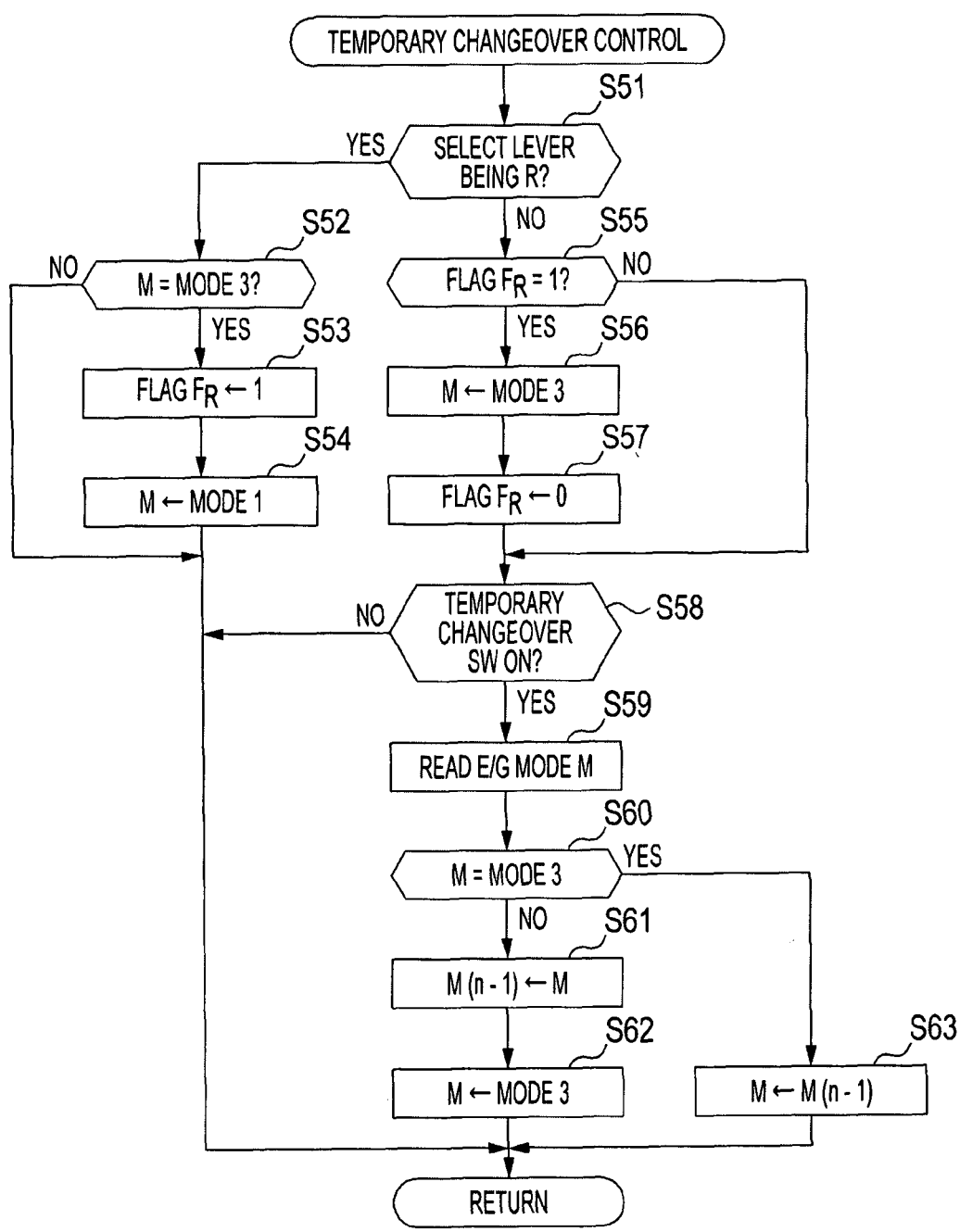
FIG. 10 is a flowchart showing a temporary changeover control routine.

Then, when this start-up time control routine is finished, the routines shown in FIG. 8 to FIG. 10 are executed for every predetermined calculation cycle. First of all, the mode map selection routine shown in FIG. 8 is explained.

In this routine, first of all, the currently set mode M is read in step S11, and it is determined which mode (normal mode 1, save mode 2 or power mode 3) is set by reference to the number of the mode M in step S12. Then, when set is the normal mode 1, the processing advances to step S13. When set is the save mode 2, the processing is branched to step S14. Further, when set is the power mode 3, the processing is branched to step S15. Here, at the time of executing the first routine after the ignition switch is turned on, the mode M is either one of the normal mode 1 or the save mode 2 and hence, the processing is not branched in step S15. However, when the driver rotates the manipulation knob 8a of the mode selection switch 8 in the right direction after the ignition switch is turned on to select the power S# mode, the mode M is set to the power mode 3 in step S23 described later and hence, the processing is branched to step S15 from step S12 at the time of executing succeeding routine.

Then, when it is determined that the mode M is set to the normal mode 1 and the processing advances to step S13, the normal mode map Mp1 stored in the non-volatile memory means of the E/G_ECU 22 is set as the mode map of this time and the processing advances to step S19. Further, when it is determined that the mode M is set to the save mode 2 and the processing advances to step S14, the save mode map Mp2 is set as the mode map of this time and the processing advances to step S19.

On the other hand, when it is determined that the mode M is set to the power mode 3 and the processing is branched to step S15, in steps S15 and S16, a cooling water temperature Tw detected by the water temperature sensor 33 as the engine temperature is compared with a predetermined lower temperature as a warm-up determination temperature TL and a predetermined upper temperature as an over heat determination temperature TH. Then, when it is determined that the cooling water temperature Tw is equal to or above the warm-up determination temperature TL (Tw≧TL) in step S15 and when it is determined that the cooling water temperature Tw is below the over heat determination temperature TH (Tw<TH) in step S16, the processing advances to step S17.

On the other hand, when it is determined that the cooling water temperature Tw is below the warm-up determination temperature TL (Tw<TH) in step S15 or when it is determined that the cooling water temperature Tw is equal to or above the over heat determination temperature TH (Tw>TH) in step S16, the processing is branched to step S18 and the mode M is set to normal mode 1 (M←mode 1) and the processing returns to step S13.

In this manner, according to this embodiment, even when the driver manipulates the mode selection switch 8 to select the power mode 3 after the ignition switch is turned on, the mode M is forcibly made to return to the normal mode 1 in the event that the cooling water temperature Tw is equal to or below the warm-up determination temperature TL or equal to or above the over heat determination temperature TH. Accordingly, a discharge quantity of exhaust emission can be suppressed at the time of engine warm-up, and the engine and its peripheral equipment can be protected from a heat defect by suppressing the output at the time of over heat. Here, when the mode M is forcibly made to return to the normal mode 1, the warning lamp 3f is turned on or blinked to inform the driver that the mode M is forcibly made to return to the normal mode 1. In this case, the return of the mode M to the normal mode 1 may be notified by a buzzer or sounds.

Next, when the processing advances to step S19 from any one of steps S13, S14 and S17, it is determined whether the mode selection switch 8 is manipulated or not. When it is determined that the manipulation of the mode selection switch 8 is not performed, the routine is finished. Further, when it is determined that the manipulation of the mode selection switch 8 is performed, the processing advances to step S20 and it is determined which mode is selected by the driver.

Then, when it is determined that the driver selects the normal mode (the knob 8a being rotated in the left direction), the processing advances to step S21 to set the mode M to the normal mode 1 (M←mode 1), and the routine is finished. Further, when it is determined that the driver selects the save mode 2 (the knob 8a being pushed) (M←mode 2), the processing advances to step S22 to set the mode M to the save mode 2 (M←mode 2), and the routine is finished. Further, when it is determined that the driver selects the power mode 3 (the knob 8a being rotated in the right direction), the processing advances to step S23 to set mode M to the power mode 3 (M←mode 3), and the routine is finished.

In this manner, in this embodiment, the E/G_ECU 22 functions as the mode selection control means.

In this embodiment, the mode M can be set to the power mode 3 by manipulating the knob 8a of the mode selection switch 8 after turning on the ignition switch and hence, it is also possible to start the vehicle with the power mode 3. In this case, the driver consciously selects the power mode and hence, the driver would not be frightened at the large driving force generated at the start.

Next, an engine control routine shown in FIG. 9 is explained.

In this routine, first of all, in step S31, the currently selected mode map (Mp1, Mp2 or Mp3: see FIG. 11) is read and, subsequently, in step S32, an engine rotational speed Ne detected by the engine rotational sensor 29 and accelerator opening θacc detected by the accelerator opening sensor 31 are read.

Then, the processing advances to step S33 in which a target torque τe which constitutes a driving force indication value is determined based on both parameters Ne and θacc by reference to the mode map read in step S31 with the interpolation calculation.

Next, the processing advances to step S34 in which a target throttle opening θe corresponding to the target torque τe is determined as a final driving force indication value.

Then, the processing advances to step S35 in which a throttle opening θth detected by the throttle opening sensor 32 is read. In step S36, a feedback control is applied to the throttle actuator 37 which performs an open/close operation of the throttle valve mounted in the electronic throttle control device such that the throttle opening θth is converged to the target throttle opening θe. Then, the routine is finished.

As a result, when the driver manipulates the accelerator pedal 14, the throttle valve is opened or closed in accordance with the mode maps Mp1, Mp2 and Mp3 corresponding to the mode M (M: normal mode 1, save mode 2, power mode 3) selected by the driver, using the accelerator opening degree θacc and the engine rotational speed Ne as parameters. When the mode M is set to the normal mode 1, an output torque is preset approximately linearly with respect to an operation amount of the accelerator pedal (accelerator opening degree θacc) and hence, the normal driving can be performed.

Further, when the mode M is set to the save mode 2, the elevation of the target torque is suppressed and hence, the driver can enjoy the acceleration work by widely using the stroke of the accelerator pedal 14 and, at the same time, it is possible to acquire both of easy drive ability and low fuel consumption in a well-balanced manner. Accordingly, even in case of a vehicle with a 3 litter engine, the smooth driving can be performed while ensuring a sufficient output corresponding to the 2 litter engine and hence, the vehicle can obtain the favorable driving performance in a practical-use region such as towns and the cities.

Further, when the mode M is set to the power mode 3, a high acceleration response is obtained and hence, the vehicle can perform more sporty traveling.

As a result, the driver can enjoy three kinds of acceleration responses which completely differ from each other with one vehicle. Accordingly, the driver can arbitrarily select the preferred driving force characteristic even after purchasing the vehicle and can drive the vehicles corresponding to three vehicles having different characteristics with one vehicle.

Further, in this embodiment, when the temporary changeover switch 11 which is mounted on the steering wheel 9 is manipulated or the selection lever 7 is positioned to the R range, the mode M is temporarily changed over. This temporarily changeover control is executed in accordance with a temporarily changeover control routine shown in FIG. 10.

In this routine, first of all, it is determined whether the selection lever 7 is positioned to the R range or not based on a signal from the inhibitor switch 42 in step S51. When it is determined that the selection lever 7 is positioned to the R range, the processing advances to step S52, while when the selection lever 7 is positioned to a range other than the R range, the processing advances to step S55.

When the processing advances to step S52, the current mode M is referred and the routine is finished except for a state in which the mode M is set to the power mode 3. Further, when the mode M is set to the power mode 3, the processing advances to step S53 to set a reverse flag FR (FR←1) and the processing advances to step S54 to set the mode M to the normal mode 1 (M←mode 1) and the routine is finished.

In this manner, according to this embodiment, when the selection lever 7 is moved to the R range in a state that the mode M is set to the power mode 3, the mode M is forcibly changed over to the normal mode 1 and hence, even when the accelerator pedal 14 is depressed slightly at driving the vehicle backward, there is no possibility that the vehicle suddenly travels backward thus acquiring the favorable backward travel performance.

On the other hand, when it is determined that the selection lever 7 is positioned to the range other than the R range in step S51 and the processing advances to step S55, the reverse flag FR is referred. When the reverse flag FR is 1 (FR=1), that is, in the first routine after the selection lever 7 is changed over to another range from the R range, the processing advances to step S56 in which the mode M is made to return to the power mode 3 (M←mode 3). Then the processing advances to step S57 in which the reverse flag FR is cleared (FR←0) and the processing advances to step S58.

As a result, in a state that after the mode M is forcibly changed over to the normal mode 1 from the power mode 3 because of the manipulation of the selection lever 7 to the R range, the selection lever 7 is moved to the D range, for example, the mode M is made to automatically return to the initial power mode 3 and hence, the driver can start the vehicle without feeling a discomfort.

Further, when it is determined that the reverse flag FR is 0 (FR=0) in step S55, the processing jumps to step S58.

Then, when the processing advances to step S58 from step S55 or step S57, it is determined whether the temporary changeover switch 11 is turned on or not. Then, when it is determined that the temporary changeover switch 11 is not turned on, the routine is finished as it is.

On the other hand, when it is determined that the temporary changeover switch 11 is turned on, the processing advances to step S59 to read the current mode M, and in step S60, it is determined whether the mode M is set to the power mode 3 or not.

Then, when it is determined that the mode M is set to a mode (normal mode 1 or save mode 2) other than the power mode 3, the processing advances to step S61 in which the mode M at the time the temporary changeover switch 11 is turned on is stored as a previous mode M(n−1) (M(n−1)←M) and the processing advances to step S62. In step S62, the current mode M is set to the power mode 3 (M←mode 3) and the routine is finished.

In this manner, according to this embodiment, even when the mode M is set to the normal mode 1 or the save mode 2 using the mode selection switch 8, the mode M can be changed over to the power mode 3 by turning on the driver's-side temporary changeover switch 11. As a result, in traveling an ascending slope which requires power, the mode M can be easily changed over to the power mode 3 from the normal mode 1 or the save mode 2 temporarily and hence, the vehicle can acquire the favorable traveling performance. Further, the temporary changeover switch 11 is mounted on the steering wheel 9 and hence, the driver can easily change over the mode M without leaving his/her hand from the steering wheel 9 thus improving the manipulability.

Further, when it is determined that the current mode M is set to the power mode 3 in step S60, the processing is branched to the step S63 in which the previous mode M(n−1) is read to be the current mode M (M←M(n−1)) and the routine is finished.

As a result, by manipulating the temporary changeover switch 11 again after the mode M is temporarily changed over to the power mode 3, the mode M is made to return to the initial mode M (normal mode 1 or save mode 2). Next, a display control applied to the MID 12 which is executed by the meter_ECU 21 is explained in detail.

Figure 12:
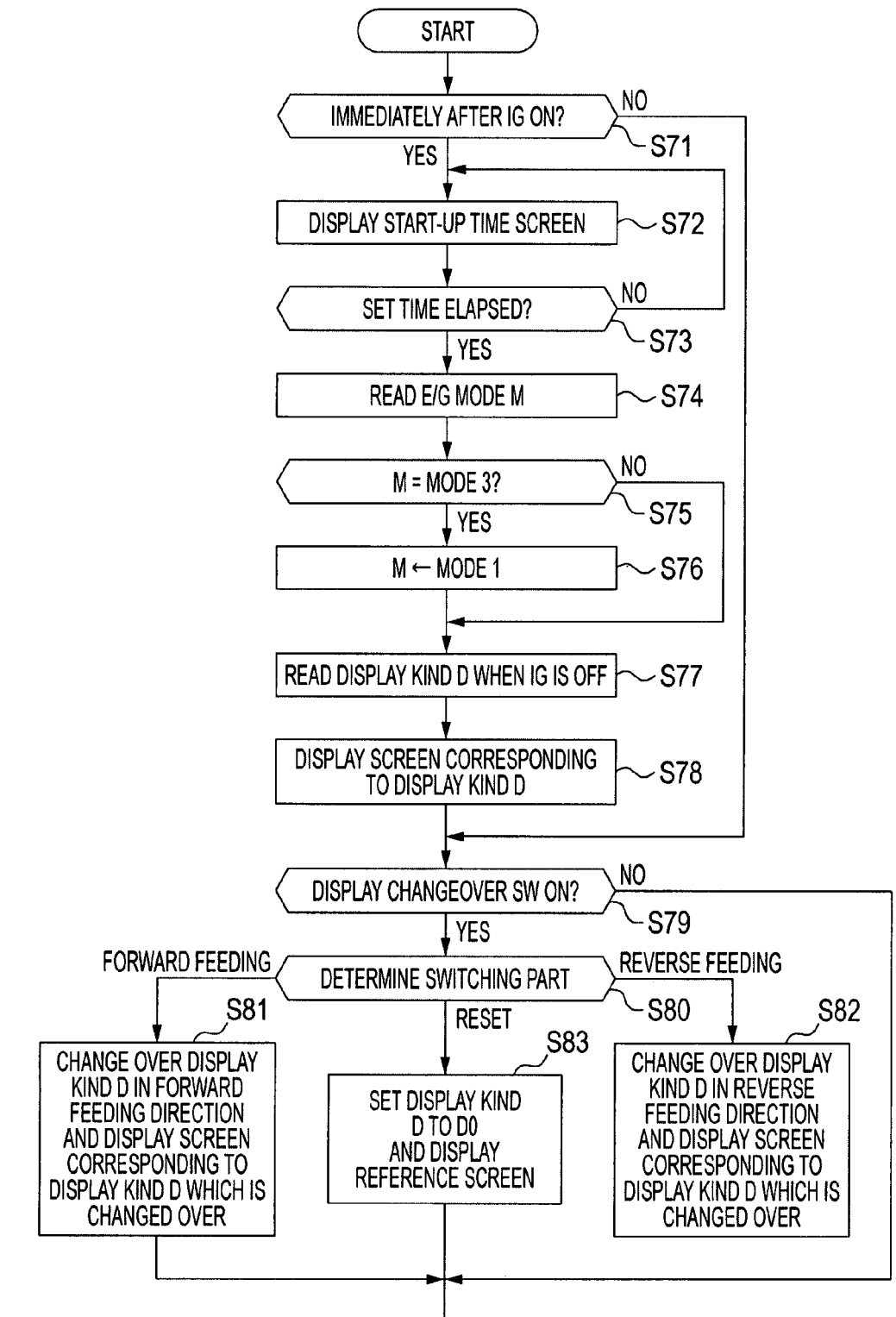
FIG. 12 is a flowchart showing an information display control routine.
Figure 12:
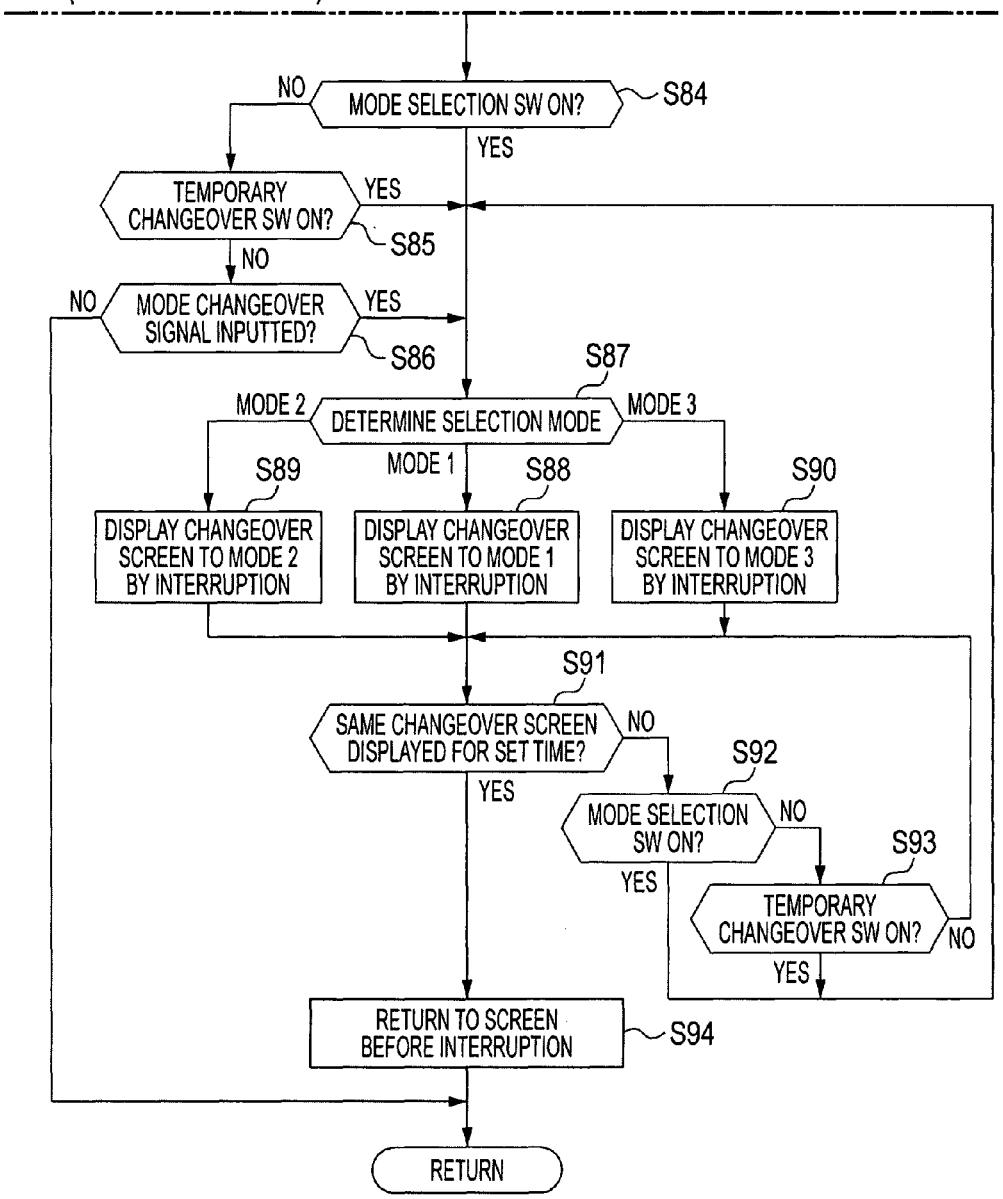

In this embodiment, the meter_ECU 21 has a function as a display control means and, for example, displays various information display images in accordance with a flowchart of a information display control routine shown in FIG. 12. In this information display control, the meter_ECU 21, basically, as described above, selectively displays the respective display images shown in FIG. 4(*a*) to FIG. 4(*f*) on the MID 12 in response to the manipulation of the display changeover switch 10 by the driver. Here, in this embodiment, to the respective display images shown in FIG. 4(*a*) to FIG. 4(*f*), ID numbers respectively indicative of intrinsic display kinds (display identification D=D0 to D5) are given, and the meter_ECU 21 performs the display control of the respective display images using these display kinds D. Further, when the mode changeover manipulation or the like is performed using the display changeover switch 10, the meter_ECU 21 displays a changeover display image which displays mode changeover information for a predetermined time on the MID 12 as an interruption image.

When this routine starts, the meter_ECU 21, first of all, in step S71, determines whether the current control is a first control immediately after the ignition switch is turned on or not. When the current control is the first control immediately after the ignition switch is turned on, the processing advances to step S72, while when the current control is not the first control immediately after the ignition switch is turned on, the processing advances to step S79.

When the processing advances to step S72 from step S71, the meter_ECU 21 displays a starting image which is preliminarily set in the nonvolatile memory means. Then, the processing advances to step S73 in which it is determined whether a set time (for example, 2 seconds) is elapsed or not from displaying of the starting image. When it is determined that the set time is not yet elapsed, the processing returns to step S72 and the meter_ECU 21 maintains the display of the starting image.

On the other hand, when it is determined that the set time is elapsed in step S73 and the processing advances to step S74, the meter_ECU 21 reads the mode M (M: normal mode 1, save mode 2, power mode 3) which is set when the ignition switch is turned off in the previous time.

Then, the processing advances to step S75 in which it is determined whether the mode M is set to the power mode 3 or not. As a result, when the mode M is set to the power mode 3, the mode M is forcibly set to the normal mode 1 (M←mode 1) and the processing advances to step S77.

On the other hand, when it is determined that the mode M is set to the normal mode 1 or the save mode 2 other than the power mode 3 in step S75, the processing advances to step S77 as it is.

In this manner, by performing the processing substantially equal to the processing of the above-mentioned start-up time control of the E/G_ECU 22 when the ignition switch is turned on, the common mode M is set by the meter_ECU 21 and the E/G_ECU 22.

Then, when the processing advances to step S77 from step S75 or step S76, the display kind D which is set when the ignition switch is turned off in the previous time is read and, in succeeding step S78, the display image corresponding to the read display kind D is displayed on the MID 12 and, thereafter, the processing advances to step S79.

Figure 13A:
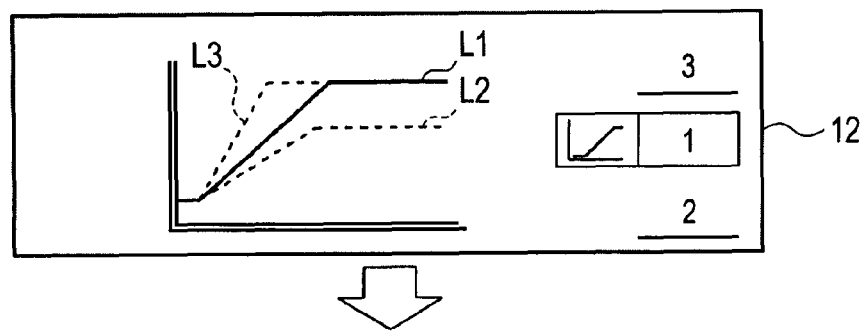
FIG. 13A to FIG. 13D are explanatory views showing a display example of a driving force display image immediately after starting.
Figure 13B:
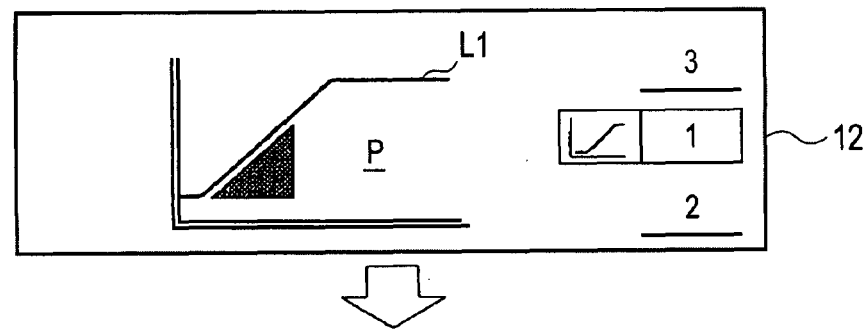
Figure 13C:
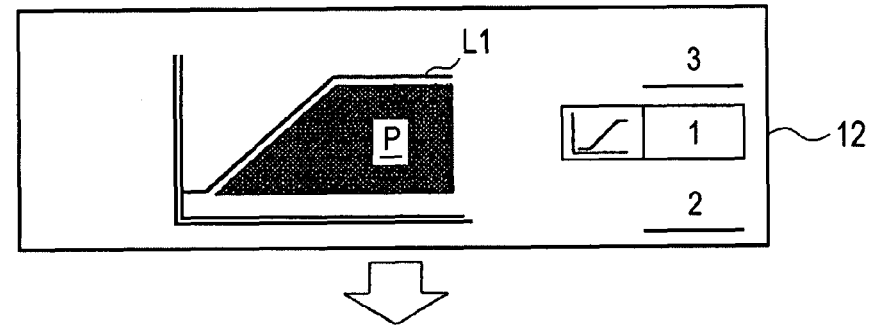
Figure 13D:
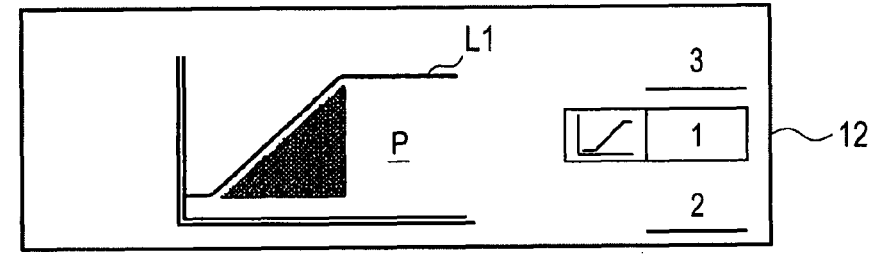

Here, in this embodiment, when the display kind D at the time of turning off the ignition switch in the previous time is D4 (that is, when the image displayed firstly after displaying of the starting image is the driving force display image) in step S78, the meter_ECU 21, for example, as shown in FIG. 13A, first of all, while displaying all acceleration-torque lines L1 to L3 simultaneously in an overlapped manner on the MID12, displays the acceleration-torque line corresponding to the current mode M in an emphasized manner. Then, after performing this display for a set time (for example, 2 second), the meter_ECU 21 fades out other acceleration-torque lines while leaving only the acceleration-torque line corresponding to the current mode M, gradually increases a power level of a power display region P set within the acceleration-torque line to a maximum level (see FIG. 13B, FIG. 13C), and displays a usual driving force display image corresponding to an acceleration operation amount of the driver (see FIG. 13D). Here, FIG. 13 illustrates a display example when the mode M is set to the normal mode 1.

In this manner, when the display kind D immediately after turning on the ignition switch is set to D4 and the driving force display image is displayed as the initial display image, by performing the relative display of the acceleration-torque line corresponding to the current mode M with other acceleration-torque line, it is possible to clearly show the driver which mode M is selected at the time of turning on the ignition switch. Further, due to an effect that the usual power level display corresponding to the accelerator opening degree is performed after the power level of the power display region P is temporarily elevated to the maximum level, it is possible to facilitate the recognition of the driving force information by the driver. Here, by setting such a display as the starting image, for example, it is possible to allow the driver to recognize the driving force information immediately after turning on the ignition switch irrespective of the display kind D.

Here, in the driving force display image of this embodiment, the power levels of the respective power display regions P set for every mode M are, for example, changed respectively in 10 stages corresponding to the accelerator opening degree (acceleration operation amount) θacc and the accelerator opening θacc is elevated to the maximum level in the vicinity of a full-open state. In this case, by setting the acceleration-torque lines L1 to L3 based on the respective characteristics of the respective mode maps Mp1 to Mp3 and by respectively setting the power display regions P within the acceleration-torque lines of each mode set in this manner, the display (display area) of the power levels corresponding to the accelerator opening θacc can be made different from each other for every mode M. Accordingly, the driver can instantaneously grasp the rough engine torque (driving force information) corresponding to the own acceleration operation in each mode M. Here, as parameters for changing the power level of the power display region P, for example, the engine rotational speed Ne, the vehicle speed and the like may be used in addition to the accelerator opening degree θacc.

When the processing advances to step S79 from step S71 or step S78, it is determined whether the ON manipulation of the display changeover switch 10 is performed or not. When the ON manipulation of the display changeover switch 10 is not performed, the processing advances to step S84 as it is. Further, when the ON manipulation of the display changeover switch 10 is performed, the processing advances to step S80 in which it is determined whether the driver manipulates any one of switch portions.

Then, when it is determined that the driver manipulates the forward feeding switch portion 10a, the processing advances to step S81 in which the display kind D is changed over to the forward feeding direction and the display image corresponding to the newly changed-over display kind D is displayed on the MID 12 and, thereafter, the processing advances to step S84. Further, when it is determined that the driver manipulates the reverse feeding switch portion 10b, the processing advances to step S82 in which the display kind D is changed over to the reverse feeding direction and the display image corresponding to the newly changed-over display kind D is displayed on the MID 12 and, thereafter, the processing advances to step S84. Further, when it is determined that the driver manipulates the reset switch portion 10c, the processing advances to step S83 in which the display kind D is changed over to the reference value (for example, D0) and the display image corresponding to the newly changed-over display kind D is displayed on the MID 12 and, thereafter, the processing advances to step S84.

When the processing advances to step S84 from step S81, step S82 or step S83, it is determined whether the ON manipulation of the mode selection switch 8 is performed or not. When the ON manipulation of the mode selection switch 8 is performed, the processing advances to step S87, while when the ON manipulation of the mode selection switch 8 is not performed, the processing advances to step S85.

Further, when the processing advances to step S85 from step S84, it is determined whether the ON manipulation of the temporary changeover switch 11 is performed or not. When the ON manipulation of the temporary changeover switch 11 is performed, the processing advances to step S87, while when the ON manipulation of the temporary changeover switch 11 is not performed, the processing advances to step S86.

Further, when the processing advances to step S86 from step S85, it is determined whether a mode changeover signal is inputted from the E/G_ECU 22 or not. When the mode changeover signal is inputted, the processing advances to step S87, while when mode changeover signal is not inputted, the routine is finished as it is. Here, the mode changeover signal is inputted to the meter_ECU 21 from the E/G_ECU 22 when the E/G_ECU 22 changes over the mode M due to a factor other than the ON manipulation of the mode selection signal 8 or the temporary changeover switch 11. As described previously, in this embodiment, the E/G_ECU 22 properly changes over the mode M when the engine cooling water temperature Tw is equal to or below the idling determination temperature TL, when the engine cooling water temperature Tw is equal to or above the high temperature determination water temperature TH or when the shift lever 7 is set to the R range, for example. However, the changeover of the mode M when the engine cooling water temperature Tw is equal to or below the idling determination temperature TL and when the shift lever 7 is set to the R range is extremely temporally and hence, in this embodiment, the E/G_ECU 22 does not output the mode changeover signal to the meter_ECU 21.

When the processing advances to step S87 from step S84, step S85 or step S86, the newly selected mode M this time is determined.

Figure 14A:
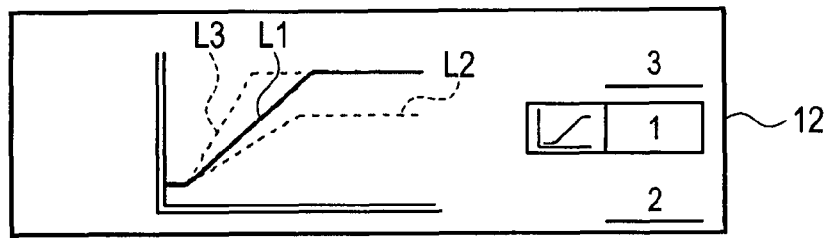
FIG. 14A to FIG. 14C are explanatory views showing changeover display images to respective modes.

When the newly selected mode M is the normal mode 1, the processing advances to step S88 and, in place of the display image displayed on the MID 12 (the image of any one of the display kinds D0 to D5) currently, the interruption display of a changeover display image to the normal mode 1 is performed and, thereafter, the processing advances to step S91. Here, in this embodiment, on the MID 12, the image shown in FIG. 14A is displayed as the changeover display image to the normal mode 1, for example. That is, the meter_ECU 21 displays the acceleration-torque line L1 corresponding to the normal mode 1 on the MID 12 in an emphasizing manner while simultaneously displaying all acceleration-torque lines L1 to L3 in an overlapped manner.

Figure 14B:
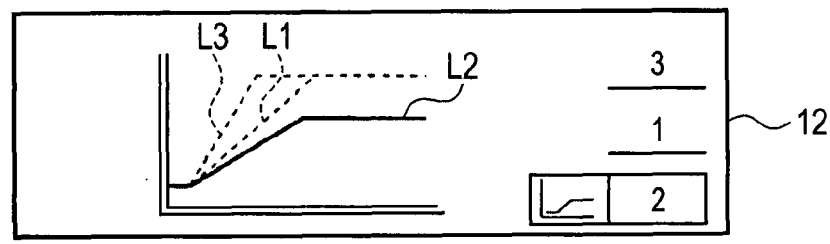

Further, when the newly selected mode M is the save mode 2, the processing advances to step S89 and, in place of the display image displayed on the MID 12 (the image of any one of the display kinds D0 to D5) currently, the interruption display of a changeover display image to the save mode 2 is performed and, thereafter, the processing advances to step S91. Here, in this embodiment, on the MID 12, the image shown in FIG. 14B is displayed as the changeover display image to the save mode 2, for example. That is, the meter_ECU 21 displays the acceleration-torque line L2 corresponding to the save mode 2 on the MID 12 in an emphasizing manner while simultaneously displaying all acceleration-torque lines L1 to L3 in an overlapped manner.

Figure 14C:
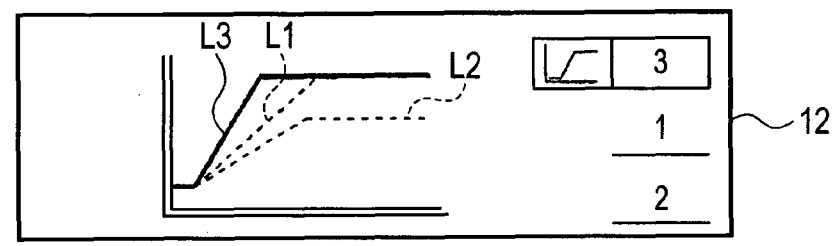

Further, when the newly selected mode M is the power mode 3, the processing advances to step S90 and, in place of the display image displayed on the MID 12 (the image of any one of the display kinds D0 to D5) currently, the interruption display of a changeover display image to the power mode 3 is performed and, thereafter, the processing advances to step S91. Here, in this embodiment, on the MID 12, the image shown in FIG. 14C is displayed as the changeover display image to the power mode 3, for example. That is, the meter_ECU 21 displays the acceleration-torque line L3 corresponding to the power mode 3 on the MID 12 in an emphasizing manner while simultaneously displaying all acceleration-torque lines L1 to L3 in an overlapped manner.

When the processing advances to step S91 from step S88, step S89 or step S90, it is determined whether the current changeover display image is displayed continuously for a set time (for example, 2 seconds) or not, and when the changeover display image is not displayed for the set time, the processing advances to step S92.

Then, in step S92, it is determined whether the ON manipulation of mode selection switch 8 is performed or not. When the ON manipulation of the mode selection switch 8 is not performed, the processing advances to step S93 in which it is determined whether the ON manipulation of the temporary changeover switch 11 is performed or not. As a result, when it is determined that the ON manipulation of neither the mode selection switch 8 nor the temporary changeover switch 11 is performed, the processing returns to step S91. On the other hand, when it is determined that the ON manipulation of the mode selection switch 8 is performed in step S92, or when it is determined that the ON manipulation of the temporary changeover switch 11 is performed in step S93, the processing returns to step S87 to changeover the currently displayed changeover display image to the changeover display image corresponding to the newly selected mode M.

Further, when it is determined that the current changeover display image is continuously displayed for a set time in step S91, the processing advances to step S94 in which the display on the MID 12 is made to return to the image before interruption (the image of any one of display kinds D0 to D5) and, thereafter, the routine is finished. Here, it is needless to say that when the interruption display of the changeover display image is performed on the driving force display image and, thereafter, the changeover display image returns to the driving force display image again, on the driving force display image, the acceleration-torque line and the power display region P corresponding to the new mode M are displayed. Further, even when the interruption display of the changeover display image is performed on the display image other than the driving force display image and, thereafter, the changeover display image returns to the previous display image, and the driving force display image is selected by the driver, the acceleration-torque line and the power display region P which correspond to the new mode M are displayed on the driving force display image.

In this manner, according to this embodiment, the driving force display image indicative of the driving force information of the vehicle is displayed on the MID 12, the acceleration-torque line (driving force characteristic line) L corresponding to the currently selected mode M is displayed on the driving force display image and, at the same time, the power level displayed in the power display region P set within the acceleration-torque line L is changed in an interlocking manner with the acceleration operation of the driver thus allowing the driver to instantaneously grasp the driving force information.

Further, by performing the interruption display of the changeover image on the MID 12 at the time of determining the changeover of the mode M, it is possible to allow the driver to properly recognize that the mode M is changed over. In such processing, the newly changed-over acceleration-torque line is displayed in an emphasizing manner compared to other acceleration-torque lines in a state that all acceleration-torque lines L1 to L3 are displayed on the changeover image in an overlapped manner and hence, it is possible to clearly exhibit the characteristic of the newly changed-over mode M to the driver.

Further, by providing the display device with the constitution in which the MID 12 is mounted on the combination meter 3 and plural kinds of display images including the driving force display image are selectively displayed on the MID12, the driving force information can be displayed by effectively making use of a narrow space on the combination meter 3.

The invention is not limited to the above-mentioned embodiment. For example, two kinds or four kinds or more of mode maps which differ in driving force characteristics from each other may be set. By setting the mode maps in this manner, the driver can drive the vehicle corresponding to two or four or more vehicles having different driving force characteristics with one vehicle. Further, the driving force characteristic of the mode map may be changed corresponding to liking of the driver.

Further, in this embodiment, the case in which the target torque is set using the plurality of mode maps having the plurality of different driving force characteristics based on the accelerator opening degree and the engine rotational speed is exemplified. However, the invention is not limited to such a case and the target torques of the respective driving force characteristics may be obtained by calculation based on the accelerator opening degree and the engine rotational speed.

Further, in this embodiment, the explanation is made using the throttle actuator 37 which drives the throttle valve mounted on the electron control throttle device as a controlling object. However, the controlling object is not limited to the throttle actuator 37. For example, in the diesel engine, an injector drive device may be set as the controlling object and an injection quantity of fuel injected from the injector drive device may be set based on a target torque τe. Further, in an engine which performs an open/close operation of an intake valve using a solenoid valve mechanism, the solenoid valve mechanism may be set as the controlling object and the valve opening of the intake valve which is driven by the solenoid valve mechanism may be set based on the target torque τe.

Further, the application of the above-mentioned driving force display image is not limited to the vehicle which mounts the engine controlled based on the plurality of driving force characteristics thereon. It is needless to say that the above-mentioned driving force display image is applicable to a vehicle which mounts an engine controlled based on single driving force characteristic thereon, for example. Further, it is needless to say that the driving force characteristic lines displayed on the driving force display image are not limited to the acceleration-torque lines.

What is claimed is:

1. A vehicle display device, comprising:
   a display means; and
   a display control means for displaying a driving force display image which displays driving force information of a vehicle on the display means,
   wherein the display control means displays driving force characteristic lines on the driving force display image and changes the display of the driving force characteristic lines with respect to an accelerator operation of a driver, and
   wherein the display control means display a driving force characteristic line corresponding to a mode on the driving force display image, and changes a display of the driving force characteristic lines with respect to an accelerator operation of the driver.

2. The vehicle display device according to claim 1, wherein the mode comprises a selected mode of a plurality of modes in which said different driving force characteristics are set,
   wherein the vehicle display device is mounted on the vehicle which includes a driving force determination means which determines a driving force corresponding to the accelerator opening degree selectively using the plurality of modes in which said different driving force characteristics are set, and
   the display control means displays a driving force characteristic line corresponding to a selected mode on the driving force display image, and changes a display of the driving force characteristic lines with respect to an accelerator operation of the driver.

3. The vehicle display device according to claim 2, wherein the display control means, when the selected mode is changed over, displays a changeover display image for displaying the changeover information of the mode to the display means as an interruption image for a set time.

4. The vehicle display device according to claim 3, wherein the display control means simultaneously displays the respective driving force characteristic lines corresponding to the respective modes on the changeover display image, and, displays the driving force characteristic line corresponding to the newly changed-over mode in an emphasizing manner.

5. The vehicle display device according to claim 2, wherein the selected mode comprises a normal mode, and
   wherein in the normal mode, the display control means display the driving force characteristic line to show that an output torque is changed linearly with respect to an operation amount of the accelerator.

6. The vehicle display device according to claim 2, wherein the selected mode comprises a save mode, and
   wherein in the save mode, the display control means displays the driving force characteristic line to show that an output torque is suppressed by a lock up control with respect to an operation amount of the accelerator.

7. The vehicle display device according to claim 2, wherein the selected mode comprises a power mode, and
   wherein in the power mode, the display control means displays a driving force characteristic line to show a maximum torque generation at a lower operation amount of the accelerator.

8. The vehicle display device according to claim 1, wherein the vehicle display device includes a display changeover means which performs a changeover manipulation of a display image displayed on the display means, and
   wherein the display control means displays plural kinds of display images including the driving force display image by selectively changing over in response to a manipulation input to the display changeover means.

9. The vehicle display device according to claim 1, wherein the driving force characteristic lines represent a relationship between an output torque of an engine and an accelerator opening degree.

10. The vehicle display device according to claim 1, wherein the driving force characteristic lines define a power display region.

11. The vehicle device according to claim 10, wherein the power display region is located inside of the driving force characteristic lines.

12. A vehicle display device, comprising:
    a display; and
    a display controller for displaying a driving force display image that displays driving force information of a vehicle on the display,
    wherein the display controller displays driving force characteristic lines on the driving force display image and changes the display of the driving force characteristic lines with respect to an accelerator operation by a driver, and
    wherein the display controller displays a driving force characteristic line corresponding to a mode on the driving force display image, and changes a display of the driving force characteristic lines with respect to an accelerator operation of the driver.

13. The vehicle display device according to claim 12, wherein the driving force characteristic lines represent a relationship between an output torque of an engine and an accelerator opening degree.

14. The vehicle display device according to claim 12, wherein the driving force characteristic lines define a power display region.

15. The vehicle display device according to claim 12, wherein the power display region is located inside of the driving force characteristic lines.

16. A vehicle display method, comprising a display controller for:
    displaying a driving force display image that displays driving force information of a vehicle;

displaying a driving force characteristic line; and changing the driving force characteristic line with respect to an acceleration operation of a driver, wherein the displaying comprises displaying the driving force characteristic line corresponding to a mode on the driving force display image and changing a display of the driving force characteristic lines with respect to said acceleration operation of the driver.

17. The vehicle display method according to claim 16, wherein the driving force characteristic lines represent a relationship between an output torque of an engine and an accelerator opening degree.

18. The vehicle display method according to claim 16, wherein the driving force characteristic lines define a power display region.

19. The vehicle display method according to claim 18, wherein the power display region is located inside of the driving force characteristic lines.

20. The vehicle display method according to claim 16, wherein the mode comprises a normal mode that displays the driving force characteristic line to show that an output torque is changed linearly with respect to an operation amount of the accelerator.

* * * * *